United States Patent
Cheng et al.

(10) Patent No.: US 7,376,063 B2
(45) Date of Patent: May 20, 2008

(54) CONTROL CIRCUIT OF OPTICAL STORAGE DEVICE AND METHOD THEREOF

(75) Inventors: Yuh Cheng, Hsin-Chu Hsien (TW); Gwo-Huei Wu, Taipei Hsien (TW)

(73) Assignee: Media Tek Inc., Hsin-Chu Hsien (TW)

( * ) Notice: Subject to any disclaimer, the term of this patent is extended or adjusted under 35 U.S.C. 154(b) by 0 days.

(21) Appl. No.: 11/425,153

(22) Filed: Jun. 20, 2006

(65) Prior Publication Data
US 2006/0285455 A1    Dec. 21, 2006

(30) Foreign Application Priority Data
Jun. 20, 2005   (TW) .............................. 94120450 A

(51) Int. Cl.
*G11B 7/004* (2006.01)
(52) U.S. Cl. ................ 369/53.28; 318/621; 369/44.11; 369/53.18
(58) Field of Classification Search ................ 318/621, 318/632, 640; 369/43, 44.11, 47.28, 47.36, 369/47.45, 53.18, 53.19, 53.23, 53.28
See application file for complete search history.

(56) References Cited

U.S. PATENT DOCUMENTS

| | | | | |
|---|---|---|---|---|
| 4,471,477 | A * | 9/1984 | Bierhoff .................. | 369/44.13 |
| 5,663,942 | A * | 9/1997 | Ishibashi et al. ......... | 369/53.34 |
| 6,469,861 | B2 * | 10/2002 | Onuki et al. ............. | 360/77.02 |
| 6,549,493 | B1 | 4/2003 | Nakamura | |
| 6,611,123 | B2 * | 8/2003 | Ono .......................... | 318/632 |
| 6,791,927 | B2 | 9/2004 | Yamanaka | |
| 6,906,986 | B2 * | 6/2005 | Lee et al. ................ | 369/44.36 |
| 6,947,359 | B2 * | 9/2005 | Yokoyama et al. ...... | 369/44.29 |
| 2003/0147315 | A1 | 8/2003 | Iwazawa, et al. | |

* cited by examiner

*Primary Examiner*—Bentsu Ro
(74) *Attorney, Agent, or Firm*—Winston Hsu

(57) ABSTRACT

A control circuit of an optical storage device includes a loop phase calculation unit for calculating a closed loop phase of a servo system according to at least one error signal of the servo system and a system control unit coupled to the loop phase calculation unit for generating an optimized control parameter according to the closed loop phase to perform compensation control, wherein the servo system comprises a tracking servo control system or a focusing servo control system, the compensation control is radial tilt control or focus balance adjustment, and the optimized control parameter is at least one optimized control parameter determined according to a plurality of closed loop phases calculated by the loop phase calculation unit.

18 Claims, 13 Drawing Sheets

CONTROL CIRCUIT OF OPTICAL STORAGE DEVICE AND METHOD THEREOF

BACKGROUND

An optical storage device is disclosed, and more particularly, a control circuit of an optical storage device and related method thereof is disclosed.

The advancements in computer processing speed and the development of the Internet have resulted in data storage requirements growing tremendously. Many optical discs, for example, digital versatile discs (DVD), are popular due to their characteristics of compact size, large storage capacity, and low price. Therefore, the corresponding optical storage devices, for example, the DVD drives or the DVD burners, are standard devices found in use with typical modern computers.

Please refer to FIG. 1, which is a diagram of a control circuit of a disc tilt control device inside an optical storage device according to US Patent Application Publication No. 2003/0147315. Please note that some devices are not shown in FIG. 1. The tilt control circuit at least comprises: a tracking error signal calculating unit 10, a loop level calculating unit 11, a system control unit 12, a radial tilt control unit 14, and a tracking servo unit 15. The tracking error signal calculating unit 10, the loop level calculating unit 11, and the tracking servo unit 15 can be utilized to form a tilt measuring device of a disc. The system control unit 12 can utilize detected loop level to represent the tilt amount and generate a control parameter according to the detected loop level to control the tilt angle between the disc 1 and the optical pickup head 3.

Please refer to FIG. 2, which is a detailed diagram of a tilt angle measuring device of the optical storage device shown in FIG. 1. As shown in FIG. 2, the portion indicated by a dashed line box is a detailed structure of the loop level calculating unit 11 shown in FIG. 1. The loop level calculating unit 11 comprises: band pass filters 1131 and 1141, full-wave rectifier 1132 and 1142, and low pass filters 1133 and 1143. The signal generator 112 can generate a disturbance signal of a sine wave. The output signal Vt generated by the tracking error signal calculating unit 10 is the conventional tracking error signal (TE signal). The loop level calculating unit 11 processes the TE signal and the signal added by the adder 111 through the band pass filters, the full-wave rectifier s, and the low pass filters to respectively obtain two loop level signals $V_{in}$ and $V_{out}$. The ratio of the loop level signals $V_{out}$ and $V_{in}$ is the open loop gain. There is a corresponding relationship between the open loop gain and the tilt amount. Therefore, the system control unit 12 can obtain the corresponding relationship between the open loop gain and the control parameter according to the loop level signals $V_{in}$ and $V_{out}$ to control the tilt angle between the disc 1 and the optical pickup head 3.

As mentioned previously, the system control unit 12 can obtain the loop levels corresponding to several control parameters. The system control unit 12 can select an optimized tilt angle control parameter according to these loop levels. However, because the calculation of the loop gain of the optical storage device requires a divider, this is complex to implement.

SUMMARY

It is therefore one of the primary objectives to provide a control circuit of an optical storage device and related method thereof, to solve the above-mentioned problem.

According to an exemplary embodiment, a control circuit of an optical disc drive is disclosed. The control circuit comprises: a loop phase calculation unit, for calculating a closed loop phase of a servo system according to at least one error signal of the servo system; and a system control unit, coupled to the loop phase calculation unit, for generating an optimized control parameter according to the closed loop phase to perform compensation control; wherein the servo system comprises a tracking servo control system or a focusing servo control system, the compensation control is radial tilt control or focus balance adjustment, and the optimized control parameter is at least one optimized control parameter determined according to a plurality of closed loop phases calculated by the loop phase calculation unit.

According to another exemplary embodiment, a control method of an optical storage device is disclosed. The control method comprises: (a) calculating a closed loop phase of a servo system according to at least one error signal of the servo system; (b) generating an optimized control parameter according to the closed loop phase to perform compensation control; wherein the servo system comprises a tracking servo control system or a focusing servo control system, the compensation control is radial tilt control or focus balance adjustment, and the optimized control parameter is at least one optimized control parameter determined according to a plurality of closed loop phases in step (a).

These and other objectives of the present invention will no doubt become obvious to those of ordinary skill in the art after reading the following detailed description of the preferred embodiment that is illustrated in the various figures and drawings.

DETAILED DESCRIPTION

The disclosure does not require dividers. Furthermore, in contrast to the related art, the disclosure reduces a band pass filter and a low pass filter. Therefore, the disclosure is easier to implement because there are fewer calculation devices.

Figure 1:
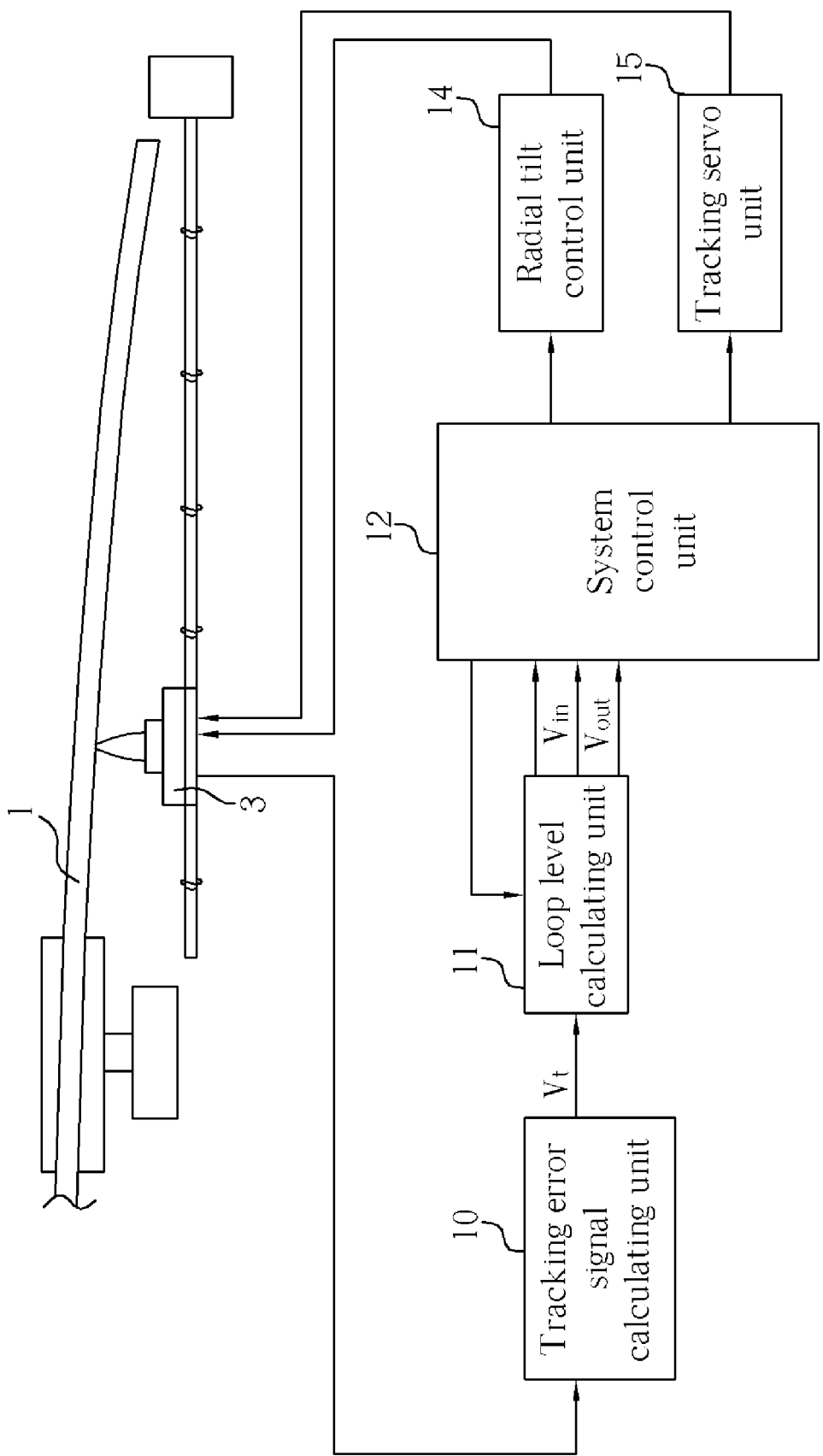
FIG. 1 is a diagram of a control circuit of a conventional optical storage device.
Figure 2:
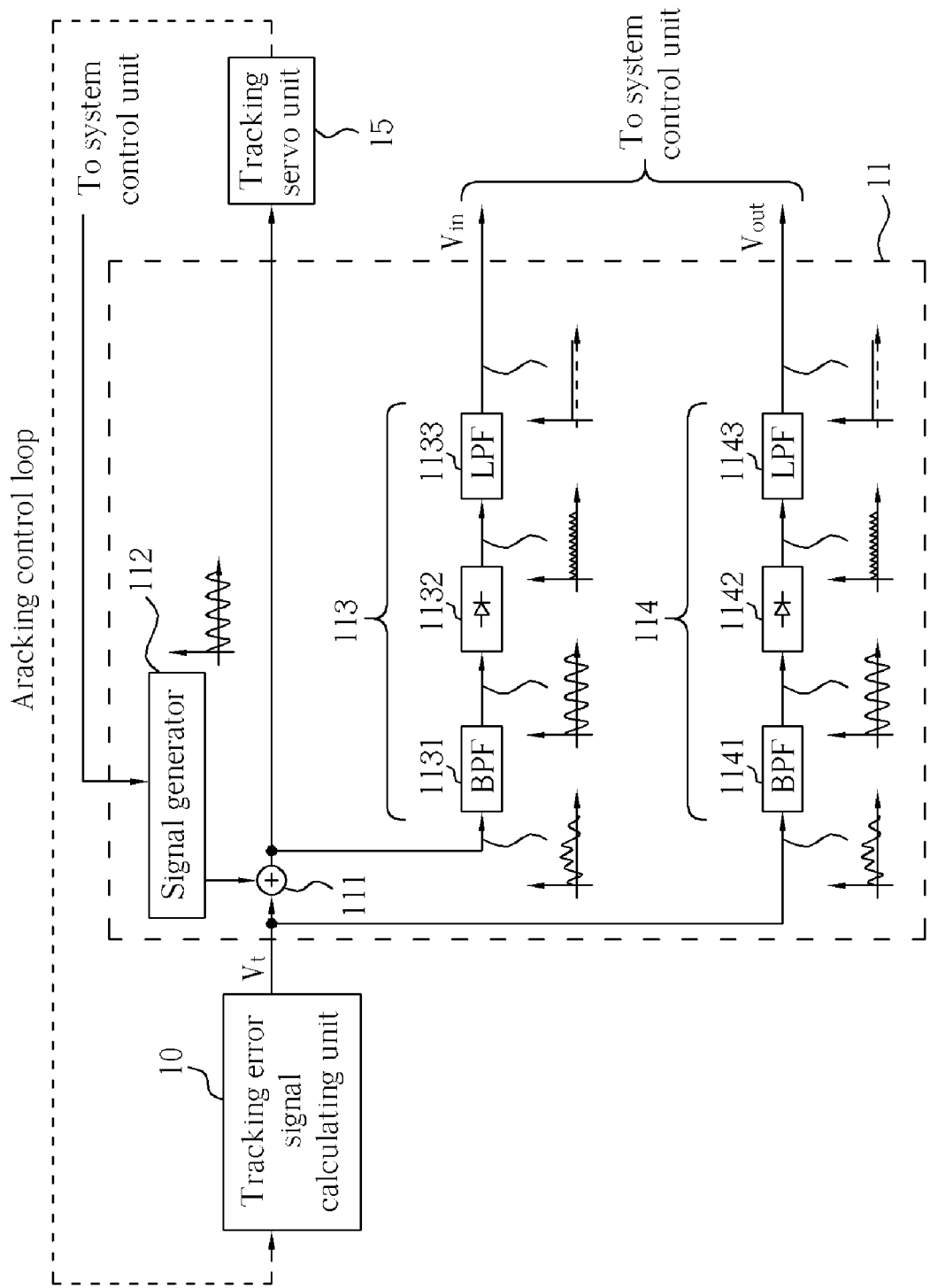
FIG. 2 is a diagram of a tracking control loop of the control circuit shown in FIG. 1.
Figure 3:
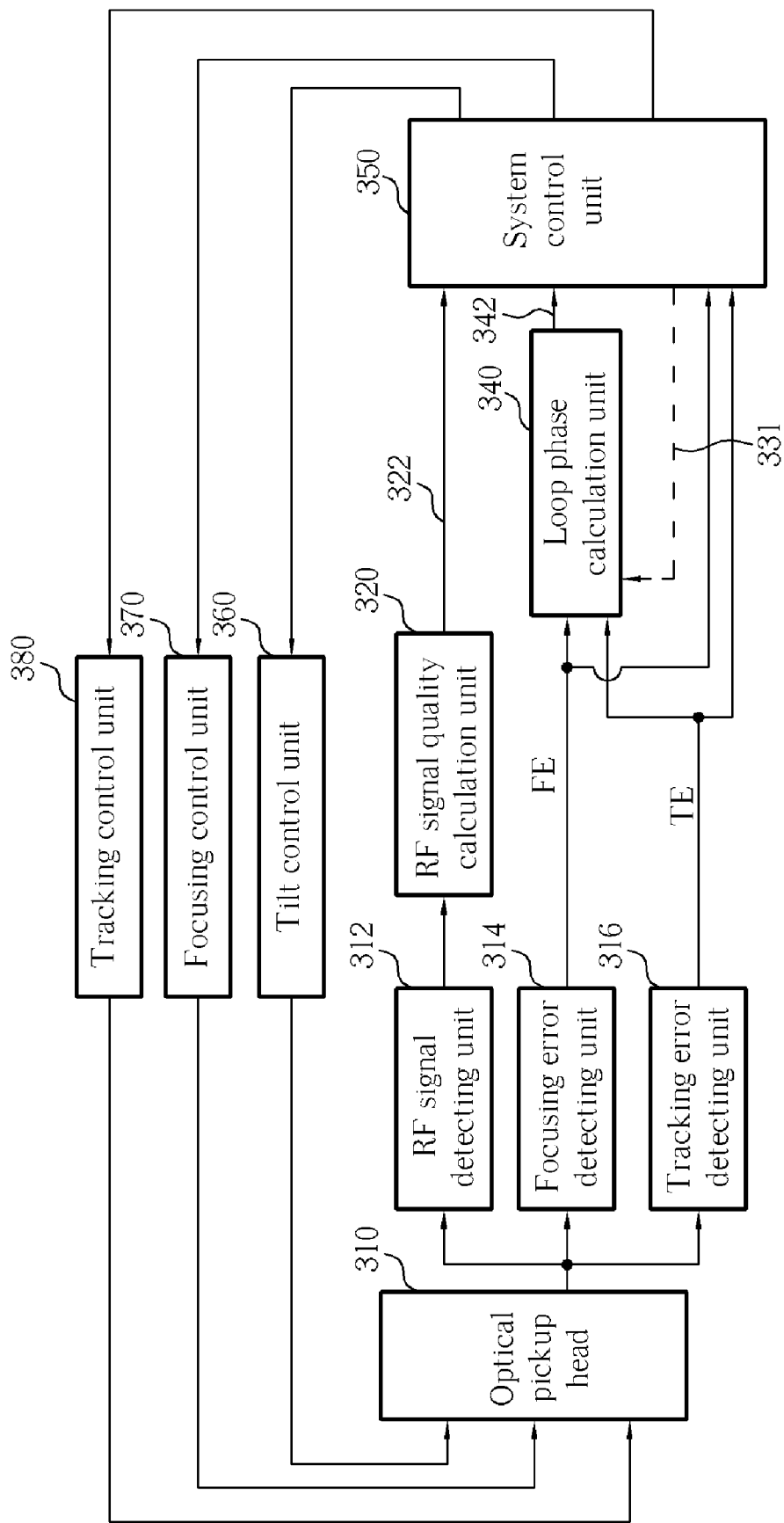
FIG. 3 is a diagram of a control circuit of an optical pickup head of an optical storage device according to the present disclosure.

Please refer to FIG. 3, which is a diagram of a control circuit of an optical storage device according to the present disclosure. Please note that the optical storage device is utilized to drive the optical disc, for example, the above-mentioned DVD drive or the DVD burner. As shown in FIG. 3, the control circuit comprises: an optical pickup head 310, an RF signal detecting unit 312, a focusing error detecting unit 314, a tracking error detecting unit 316, an RF signal quality calculation unit 320, a loop phase calculation unit 340, a system control unit 350, a tilt control unit 360, a focusing control unit 370, and a tracking control unit 380.

Figure 4:
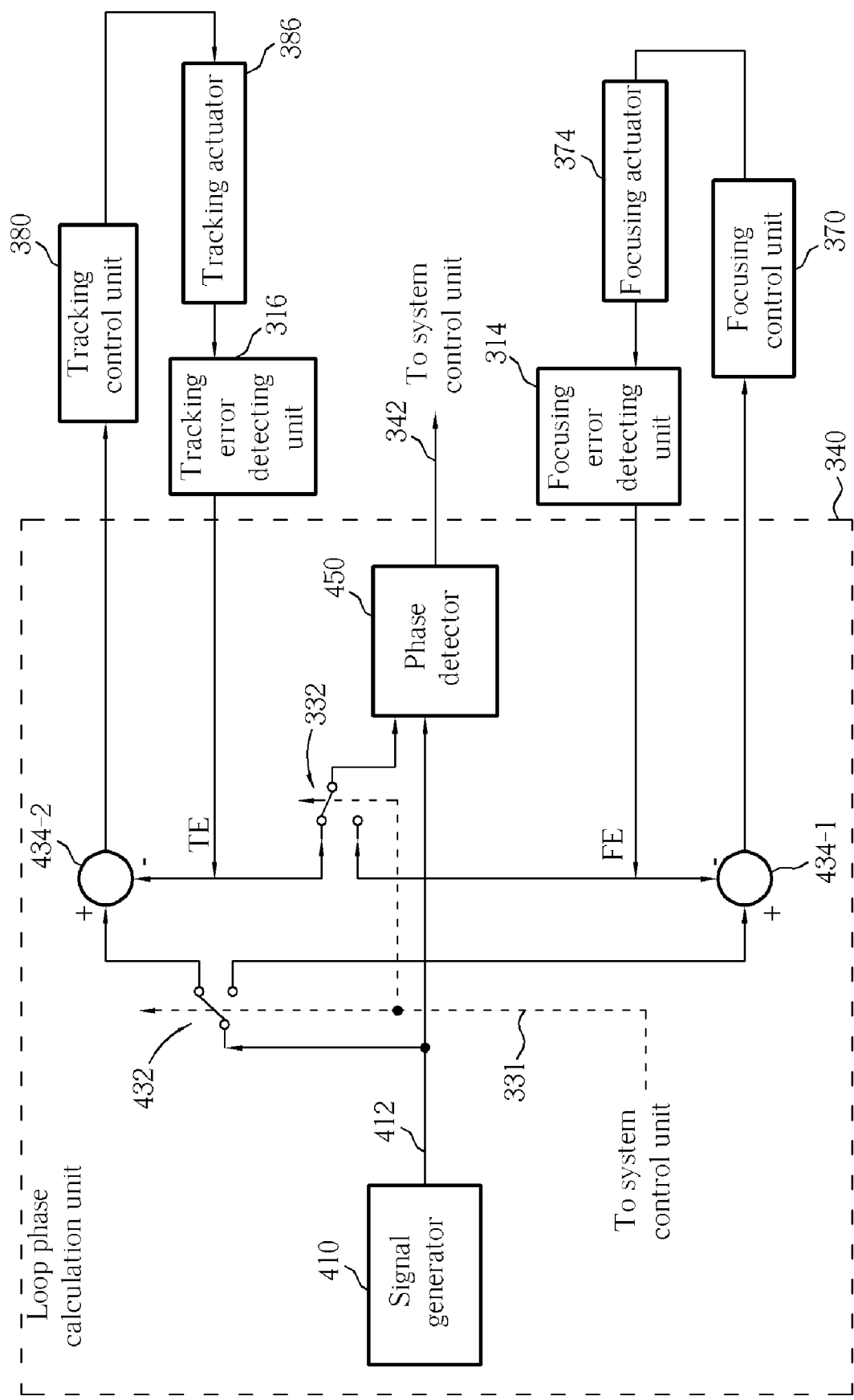
FIG. 4 is a diagram of devices for detecting closed loop phases inside the control circuit shown in FIG. 3 of a first embodiment.

As shown in the first embodiment in FIG. 4, the loop phase calculation unit 340 of the control circuit at least comprises: a signal generator 410, selecting units 332 and 432, subtracters 434-1 and 434-2, and a phase detector 450, where the subtracters 434-1 and 434-2 can be implemented by other arithmetic units (e.g., adders). The system control unit can select a first loop or a second loop through the selecting units 332 and 432. The first loop is a focusing servo control system comprising the above mentioned devices 434-1, 370, 374, and 314. In addition, the second loop is a tracking servo control system comprising the above-mentioned devices 434-2, 380, 386, and 316. In this embodiment, the focusing actuator 374 and the tracking actuator 386 are positioned inside the optical pickup head 310 shown in FIG. 3. To simply illustrate, some devices such as the signal generator 41 0, subtracters 434-1 and 434-2, the focusing actuator 374, and the tracking actuator 386 are all omitted in FIG. 3. However, this is only for the illustration, not a limitation of the present disclosure.

The system control unit 350 can generate control signals for respectively controlling the tilt actuator (not shown), the focusing actuator 374, and the tracking actuator 386 through the control voltage generated by the tilt control unit 360, the focusing control unit 370, and the tracking control unit 380. Additionally, the system control unit 350 can control the tilting, focusing, and tracking operations of the optical pickup head 310 through the above-mentioned tilt actuator, the focusing actuator 374, and the tracking actuator 386. The system control unit can determine at least one optimized control parameter from a plurality of control parameters corresponding to a plurality of closed loop phases according to these closed loop phases generated by the loop phase calculation unit 340, where the loop phase calculation unit 340 outputs the close loop phases to the system control unit 350 through its output signal 342. In this embodiment, the control parameter T, which can be selected by the system control unit 350, comprises ten control parameter Ti, where i equals 0, or 1, or 2, or 3, . . . , or 9, and the above-mentioned tilt actuator controls the tilt angle of the optical pickup head 310 according to a control parameter Ti determined by the system control unit 350. The system control unit 350 can select one of the ten control parameters T0 through T9, and perform tilt compensation control through the tilt control unit 360 according to the selected control parameter such that the optical pickup head 310 can achieve the best working efficiency. In addition, through changing the offset of the focusing control unit 370, the focusing balance can be compensated. According to this embodiment, the control parameter U, which can be selected by the system control unit 350, comprise ten control parameters U1, where i=0, or 1, or 2, or 3 . . . or 9. Similarly, the system control unit 350 can select one of the ten control parameters U0-U9 to compensate the offset of the focusing control unit 370 such that the optical pickup head 310 can achieve the best working efficiency. In the following disclosure, the control parameter T is utilized to illustrate the operation of an embodiment. However, the control parameter can also be utilized in other embodiments and this obeys the spirit of the present disclosure.

Please note that the selecting operation of the above-mentioned control parameters Ti can be determined through utilizing the circuit shown in FIG. 4 to measure the closed loop phases of the first loop and the second loop. Through measuring a plurality of closed loop phases between an error signal and the disturbance signal 412 generated by the signal generator 410, the system control unit 350 can perform the selection of the above-mentioned control parameters Ti according to the closed loop phases 342. In this embodiment, the above-mentioned error signal can be the tracking error signal (TE) or the focusing error signal (FE) shown in FIG. 4.

In the present disclosure, a closed loop phase can represent a phase difference between two phases or the level difference between two signals having difference phases (i.e., the phase measuring level). Please note that the phase difference is the product of the phase measuring level and a constant value. Therefore, the phase measuring level can substantially represent the phase difference. For example, if the two signals are respectively the error signal and the disturbance signal 412, which respectively have two phases, the phase measuring level is the level difference between the error signal and the disturbance signal 412. In this embodiment, the closed loop phases are a plurality of phase measuring levels, which are outputted through the output signal 342, where each phase measuring level is a level of the output signal 342.

Figure 5:
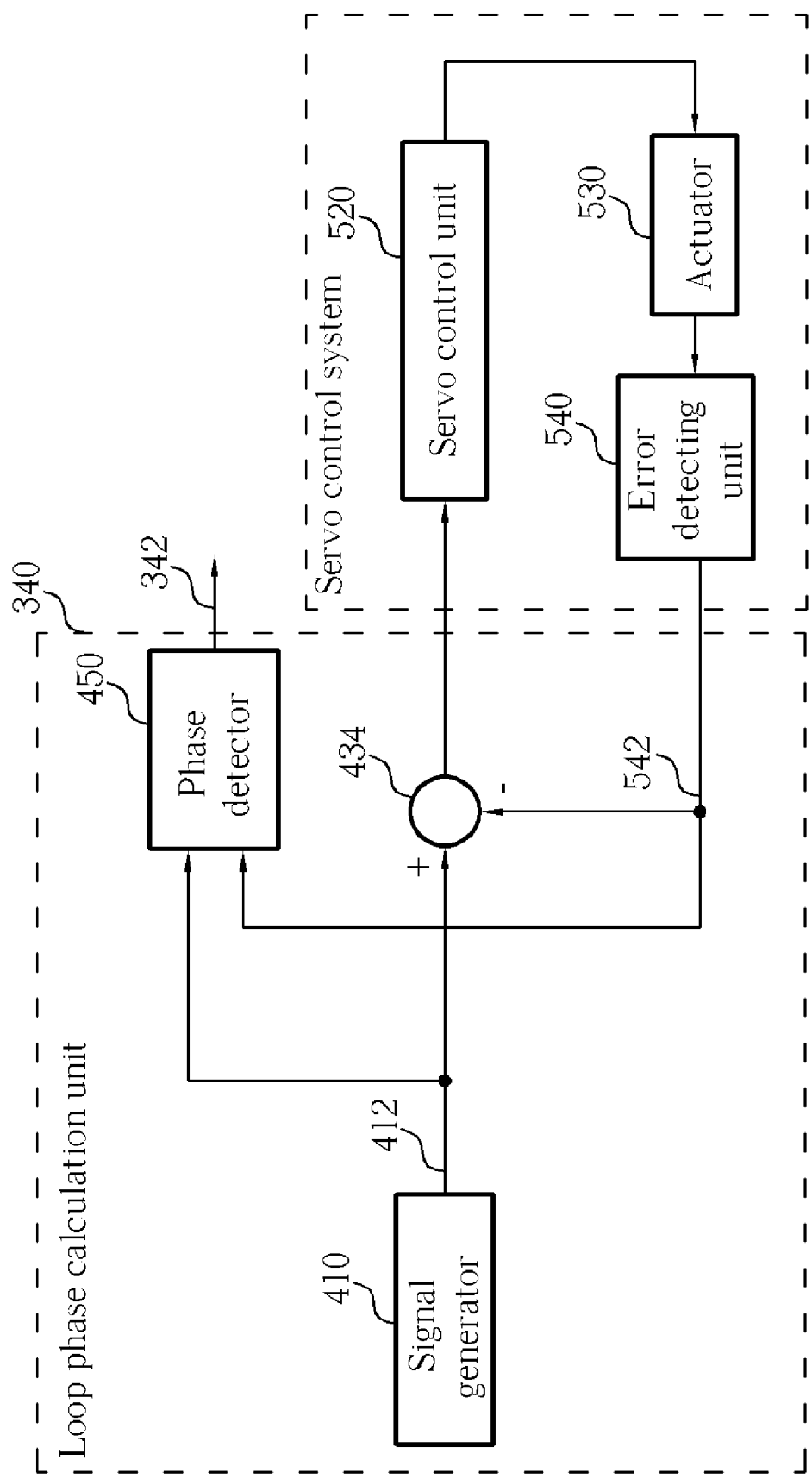
FIG. 5 is a diagram showing the devices shown in FIG. 4 where the selection signal is in a first state or a second state.

Please refer to FIG. 5, which is a diagram showing that the selection signal 331 is in a first state or a second state. When the selection signal is in the first state, this represents that the system control unit 350 selects the closed loop phase of the focusing servo control system. Therefore, the subtracter 434, the servo control unit 520, the actuator 530, the error detecting unit 540, and the error signal 542 respectively represent the subtracter 434-1, the focusing control unit 370, the focusing actuator 374, the focusing error detecting unit 314, and the focusing error signal FE. On the other hand, when the selection signal 331 is in the second state, this represents that the system control unit 350 selects the closed loop phase of the tracking servo control system. Therefore, the subtracter 434, the servo control unit 520, the actuator 530, the error detecting unit 540, and the error signal 542 shown in FIG. 5 respectively represent the subtracter 434-2, the tracking control unit 380, the tracking actuator 386, the tracking error detecting unit 316, and the tracking error signal TE shown in FIG. 4.

In this embodiment, the disturbance signal 41 2 can be a disturbance signal having a square waveform. And the calculation unit 434 is utilized to perform subtraction on the disturbance signal 412 and the error signal 542 and output the calculation result to the phase detector 450. Furthermore, the phase detector 450 can calculate the closed loop phases between the error signal 542 and the disturbance signal 412 and output the closed loop phase through the output signal 342, where the closed loop phases respectively correspond to control parameters T0 through T9 of the optical pickup head 310.

In other words, through determining a control parameter Ti one by one to control the optical pickup head 310 and calculating the closed loop phases corresponding to each control parameter Ti through the phase detector 450, the system control unit 350 can obtain the ten closed loop phases corresponding to the ten control parameters T0 through T9 one by one. According to the ten closed loop phases, the system control unit 350 can select one control parameter Tx from the ten control parameters T0 through T9 and utilize the tilt control unit 360 according to the control parameter Tx to compensate and control the tilt angle between the optical disc and the optical pickup head 310.

Figure 6:
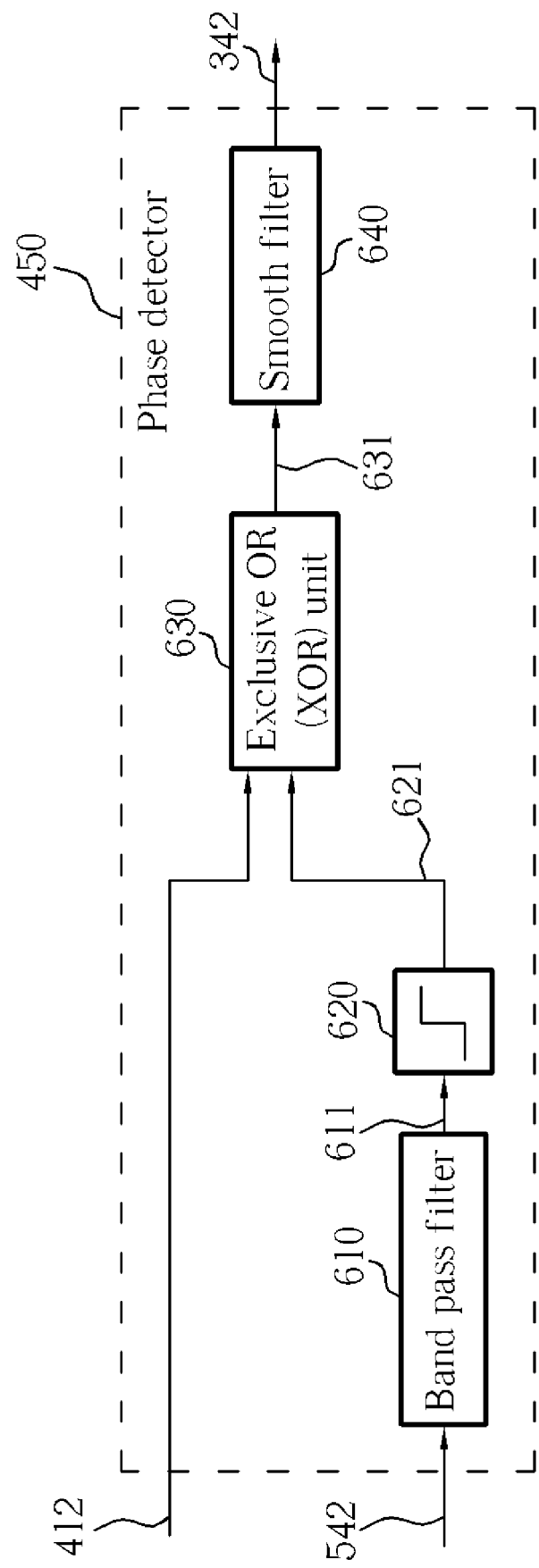
FIG. 6 is a diagram of a loop phase calculation unit shown in FIG. 3.

The operation of the above-mentioned phase detector 450 is illustrated as follows. As shown in FIG. 6, the phase detector 450 comprises: a band pass filter 610, a digitizing unit 620, an exclusive OR (XOR) unit 630, and a smooth filter 640. The band pass filter 610 filters the error signal 542 to generate a band pass filtered signal 611. And the digitizing unit 620 generates a binary signal 621 according to the band pass filtered signal 611, where the binary signal 621 has a high level and a low level. In this embodiment, the digitizing unit 620 is a slicer. The XOR unit 630 performs an XOR logic operation on the disturbance signal 412 and the binary signal 621 to generate a pulse signal 631, where the difference between the high level width and the low level width within a period of the pulse signal 631 can represent the phase difference between the disturbance signal 412 and the error signal 542. The smooth filter 640 can be implemented by the low pass filter for filtering the pulse signal 631 to generate the above-mentioned output signal 342. As mentioned previously, in this embodiment, each phase measuring level is a level of the output signal 342 (in particular, the level of the output signal 342 is the phase measuring level $\Delta_{TF}$ of a closed loop transfer function). In addition, the phase measuring level $\Delta_{TF}$ of the closed loop transfer function represents a phase $\phi_{TF}$ of the closed loop transfer function, where the level of the output signal 342 is equal to the absolute value of the phase difference between the disturbance signal 412 and the error signal 542. It can be illustrated by the following equation:

$$|\phi_{TF}|=\Delta_{TF}*180°, -180°\leq \phi_{TF} \leq 0°;$$

In the above equation, the value 180 can be utilized to perform the transformation between the phase measuring level $\Delta_{TF}$ and the phase $\phi_{TF}$ of the closed loop transfer function. Therefore, in the application of the present disclosure, the phase measuring level $\Delta_{TF}$ can represent the absolute value of the phase $\phi_{TF}$ of the closed loop transfer function.

Figure 7:
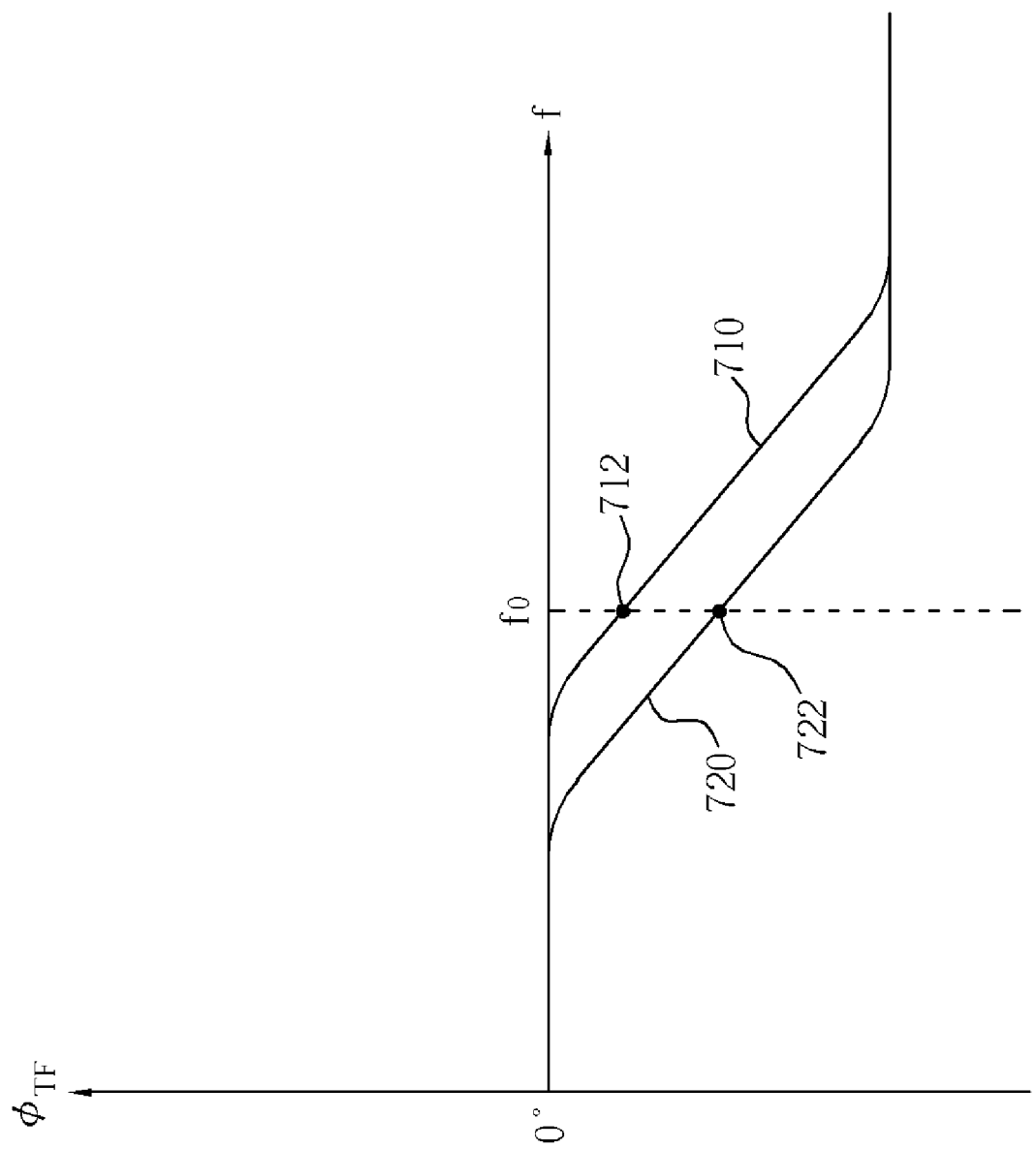
FIG. 7 is a diagram of a curve showing the relationship between the closed loop phase and the frequency.

Through the connections among devices shown in FIG. 5, the curve showing the relationship between the phase $\phi_{TF}$ of the closed loop transfer function and the frequency f is shown in FIG. 7. Because the system control unit 350 orderly selects a control parameter Ti from the control parameters T0 through T9, the curve can initially be the curve 720 shown in FIG. 7, and then the curve may shift to the right to be the curve 710. Lastly, the curve may shift to the left until it returns to the original curve 720.

As shown in FIG. 7, the dotted line, which passes through the frequency fo of the error signal 412, respectively crosses the curve 710 and the curve 720 at the point 712 and the point 722. Therefore, when the system control unit 350 orderly selects a control parameter Ti from the control parameters T0 through T9, the phase $\phi_{TF}$ of the closed loop transfer function is initially at the point 722, and then is shifted up to the point 712, at last it is shifted back to the point 722. The close loop phase (that is, a plurality of phase measuring levels $\Delta_{TF}$ of the closed loop transfer function) calculated by the above-mentioned loop phase calculation unit 340 respectively correspond to the gradually-changing curves (such as the curves 710 and 720) and the distances between the points (such as the points 712 and 722) and the horizontal axis.

In this embodiment, the RF signal quality calculation unit 320 can calculate a plurality of RF quality indexes $Q_{RF}$ of the data section of the optical disc read by the optical storage device, where the RF signal quality index corresponds to partial response signal-to-noise ratio (PRSNR), sequenced amplitude margin (SAM), or simulated bit error rate (SBER). The system control unit 350 can gradually obtain the ten RF signal quality indexes corresponding to the ten control parameters T0 through T9 by determining a control parameter Ti to control the optical pickup head 310 and utilizing the RF signal quality calculation unit 320 to calculate the RF signal quality index corresponding to the selected control parameter Ti. According to the ten RF signal quality indexes, the system control unit 350 can select a control parameter Ty from the ten control parameters T0 through T9 and utilize the tilt control unit 360 according to the control parameter Ty to compensate and control the tilt angle between the optical pickup head 310 and the disc such that the optical pickup head 310 can achieve the best working efficiency. Please note that the optimized control parameter Ty, which is determined according to the RF signal quality index $Q_{RF}$, is often more practical in offering the optical pickup head 310 the best working efficiency than is the optimized control parameter Ty determined according to the phase measuring level $\Delta_{TF}$ of the closed loop transfer function. Furthermore, the RF signal quality index $Q_{RF}$ is utilized in the data section of the optical disc, but phase measuring level $\Delta_{TF}$ of the closed loop transfer function can be utilized both in the data section and the non-data section. Therefore, for a track radius r1 of the optical disc, the system control unit 350 can firstly calculate the offset $\Delta T$ between the control parameters Tx and Ty. Next, for another track radius r2 of the optical disc, the system control unit 350 can calculate the phase measuring level $\Delta_{TF}$ of the closed loop transfer function. Lastly, the system control unit 350 can calculate the optimized control parameter corresponding to the track radius r2 according to the offset $\Delta T$ and the phase measuring level $\Delta_{TF}$ of the closed loop transfer function.

Figure 8:
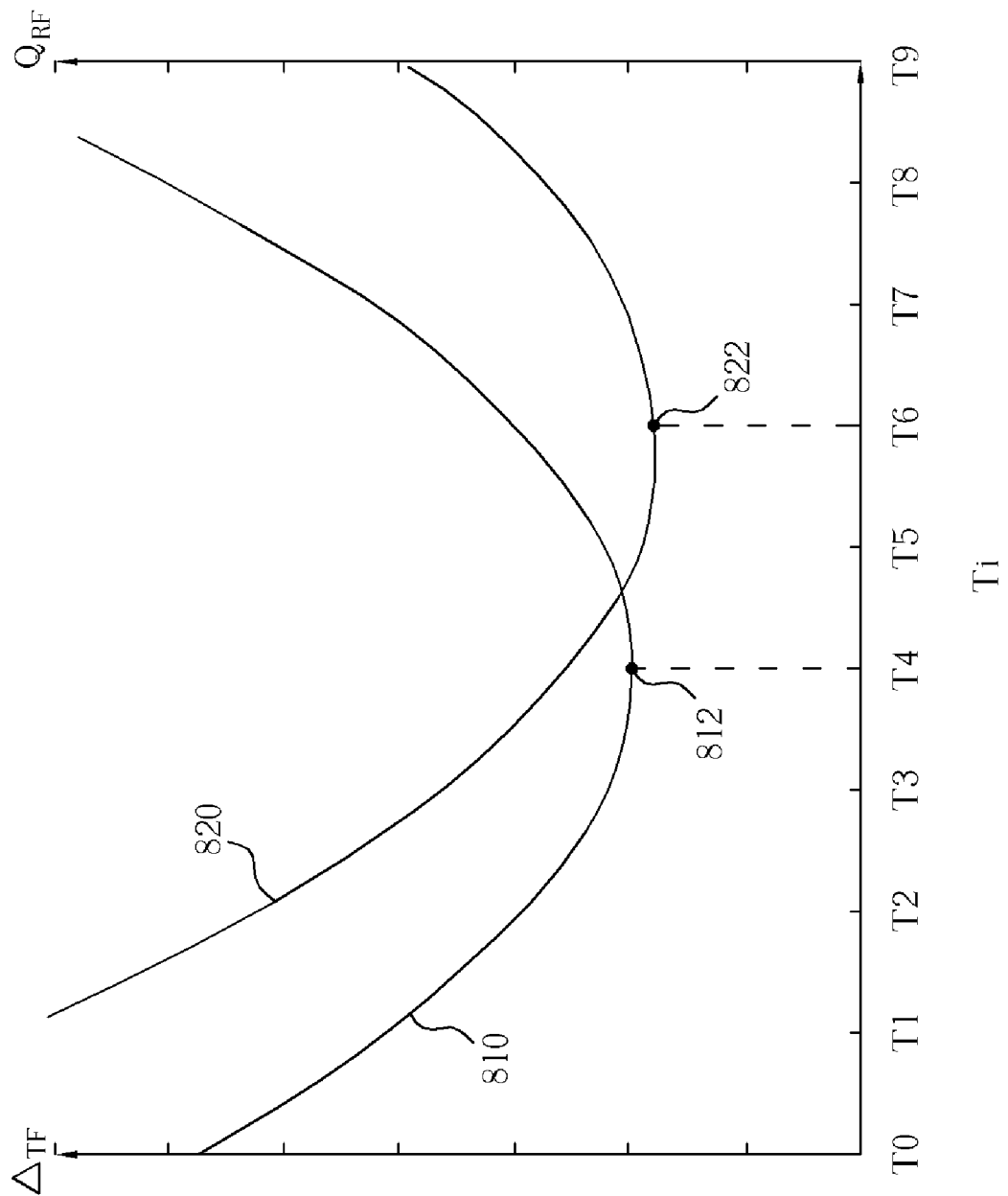
FIG. 8 is a diagram of two curves showing the relationship between the phase measuring level and the control parameter, and the relationship between the RF signal quality index and the control parameter.

Please refer to FIG. 8, which is a diagram of two curves showing the relationship between the phase measuring level $\Delta_{TF}$ and the control parameter Ti and the relationship between the RF signal quality index $Q_{RF}$ and the control parameter Ti. The system control unit 350 records the ten phase measuring levels $\Delta_{TF}$ corresponding to the ten control parameters T0 through T9 such that the curve 810 shown in FIG. 8 can be obtained. From the curve 810, it can be seen that the point 812 is the minimum of all points of the curve 810, and the point 812 correspond to the control parameter T4. Therefore, the system control unit 350 can select the control parameter T4 as an optimized control parameter Tx from the ten control parameters T0 through T9. Furthermore, the system control unit 350 records the ten RF signal quality indexes corresponding to the ten control parameters T0 through T9 such that the curve 820 shown in FIG. 8 can be obtained. Please note, the point 822 is the minimum of all points of the curve 820, and the point 822 corresponds to the control parameter T6. Therefore, the system control unit 350 can select the control parameter T6 as an optimized control parameter Ty from the ten control parameters T0 through T9. In this case, the above-mentioned offset is two measurement units of the horizontal axis.

Moreover, in another embodiment, the optimized value of the RF signal quality indexes $Q_{RF}$ is the maximum (that is, the curve of RF signal quality index $Q_{RF}$ and the control parameter Ti forms a convex shape and has a single maximum point), the values of all RF signal quality indexes $Q_{RF}$ can be transformed to be negative such that the optimized value becomes the minimum (that is, the curve is transformed to have a concave shape and has a single minimum point).

Figure 9:
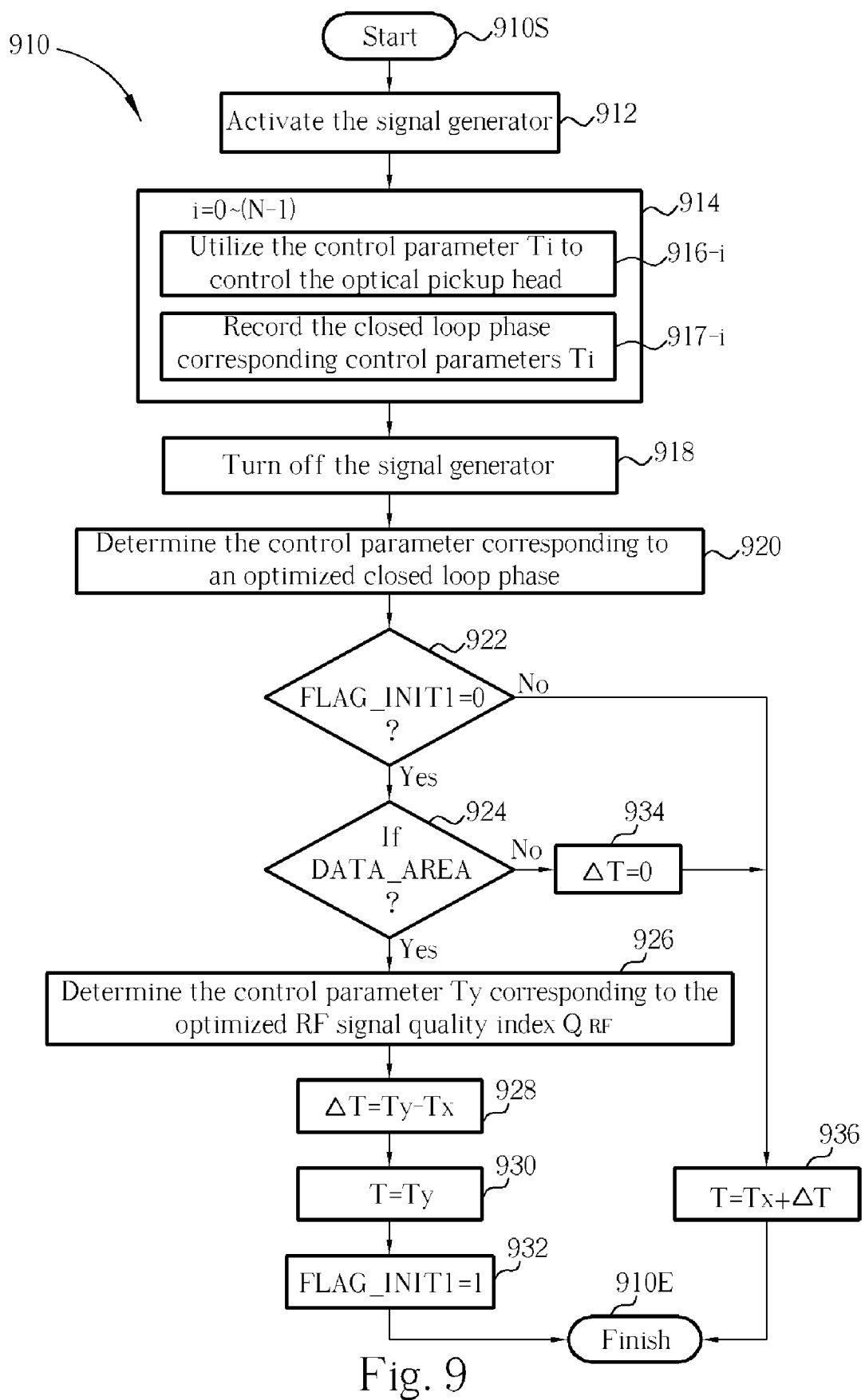
FIG. 9 and FIG. 10 show flow charts of a control method of the optical storage device according to the present disclosure.
Figure 10:
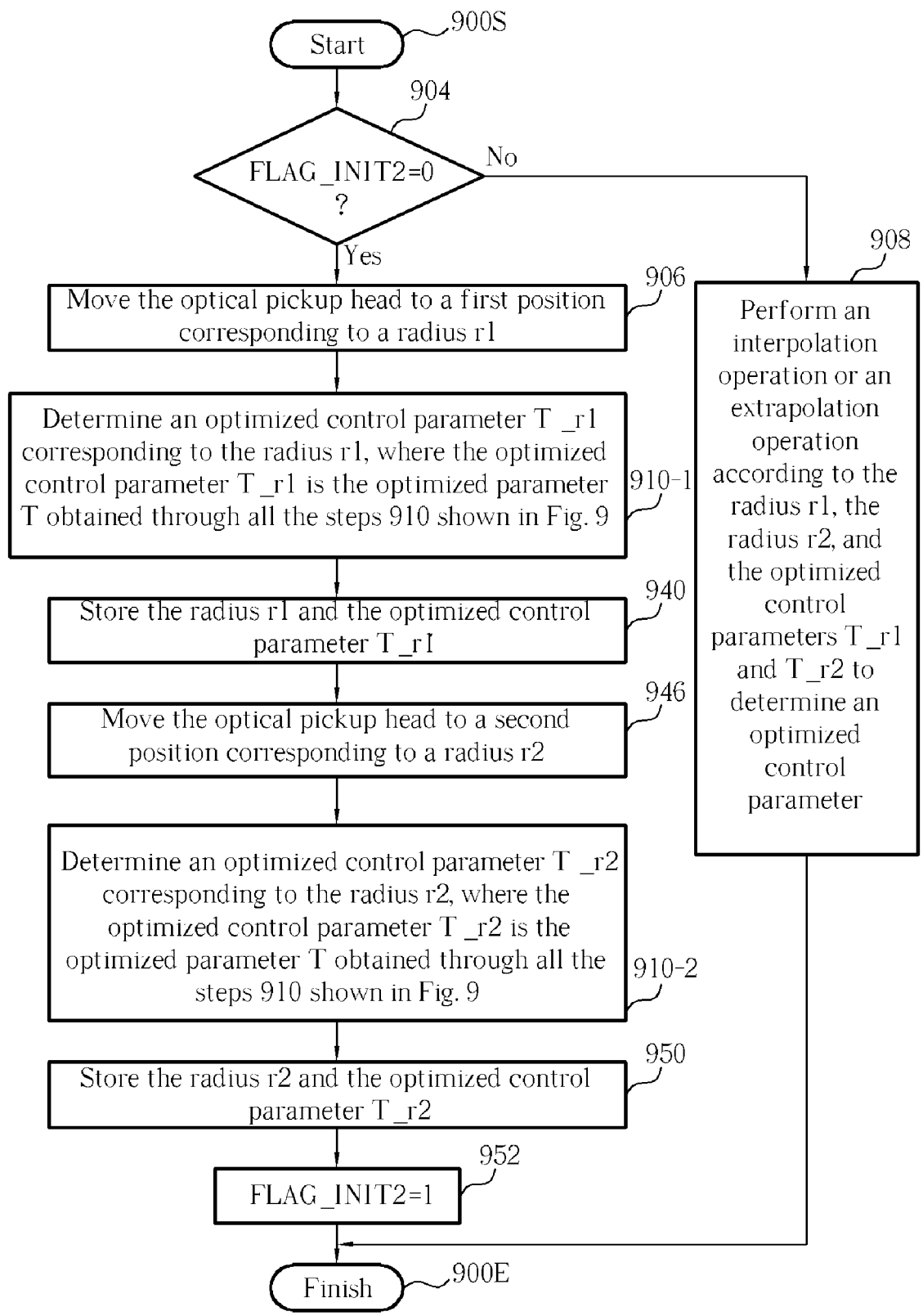

The above-mentioned control method is illustrated through the flow chart shown in FIG. 9 and FIG. 10. Please note, all steps 910 in FIG. 9 are performed in step 910-1 and step 910-2 shown in FIG. 10. The steps of FIG. 9 are illustrated as follows.

Step 910S: Start;

Step 912: Activate the signal generator 410;

Step 914: Perform the step 916-*i* and step 917-*i*, where i=0 through (N-1);

Step 916-*i*: Utilize the control parameter Ti to control the optical pickup head 310;

Step 917-*i*: Record the closed loop phase corresponding control parameters Ti;

Step 918: Turn off the signal generator 410;

Step 920: Determine the control parameter corresponding to an optimized closed loop phase (that is, determine an optimized value from a plurality of phase measuring levels $\Delta_{TF}$ of the closed loop transfer function calculated by the loop phase calculation unit 340. And in this embodiment, the optimized value is the minimum);

Step 922: If FLAG_INIT1=0, then go to step 924; otherwise, go to step 936;

Step 924: If DATA_AREA=1, then go to step 926; otherwise, go to step 934; please note, the step 924 is performed according to the flag DATA_AREA, where the flag DATA_AREA=1 represents that the current reading position is located in the data section, and the flag DATA_AREA=0 represents that the current reading position is located in the non-data section;

Step 926: Determine the control parameter Ty corresponding to the optimized RF signal quality index $Q_{RF}$;

Step 928: Calculate the offset ΔT, where ΔT=Ty−Tx;

Step 930: Define T=Ty;

Step 932: Define FLAG_INIT1=1;

Step 934: Define ΔT=0;

Step 936: Define T=Tx+ΔT;

Step 910E: Finish.

In addition, the steps shown in FIG. 10 are illustrated as follows.

Step 900S: Start;

Step 904: If FLAG_INIT2=0, then go to step 906; otherwise, go to step 908;

Step 906: Move the optical pickup head 310 to a first position corresponding to a radius r1;

Step 910-1: Determine an optimized control parameter T_r1 corresponding to the radius r1, where the optimized control parameter T_r1 is the optimized parameter T obtained through all the steps 910 shown in FIG. 9;

Step 940: Store the radius r1 and the optimized control parameter T_r1

Step 946: Move the optical pickup head 310 to a second position corresponding to a radius r2;

Step 910-2: Determine an optimized control parameter T_r2 corresponding to the radius r2, where the optimized control parameter T_r2 is the optimized parameter T obtained through all the steps 910 shown in FIG. 9;

Step 950: Store the radius r2 and the optimized control parameter T_r2;

Step 952: Define FLAG_INIT2=1;

Step 908: Perform an interpolation operation or an extrapolation operation according to the radius r1, the radius r2, and the optimized control parameters T_r1 and T_r2 to determine an optimized control parameter (that is, the optimized value of the control parameter T) corresponding to a predetermined radius r;

Step 900E: Finish.

Figure 11:
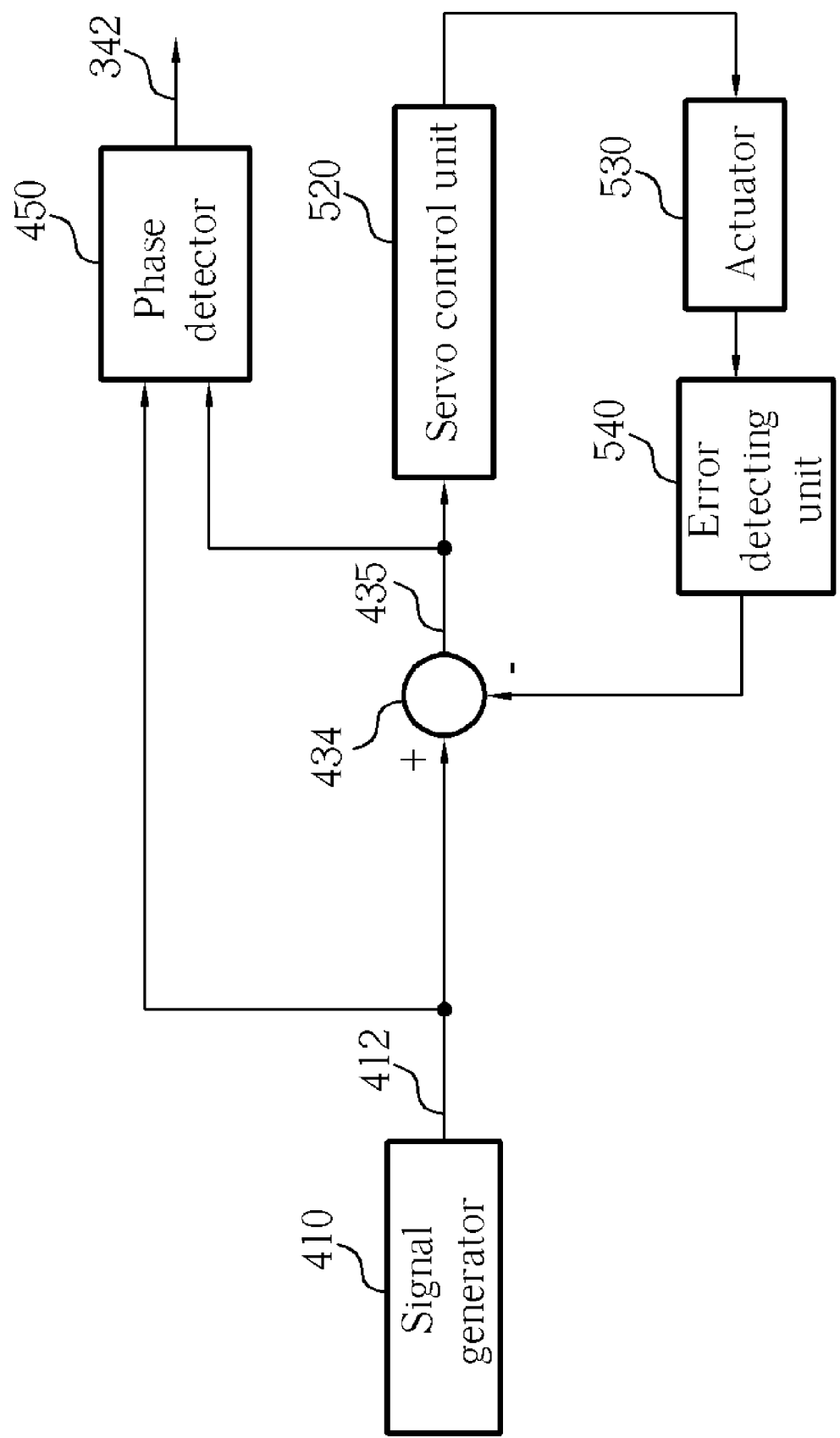
FIG. 11 is a diagram of devices for detecting closed loop phases inside the control circuit shown in FIG. 3 of a second embodiment.
Figure 12:
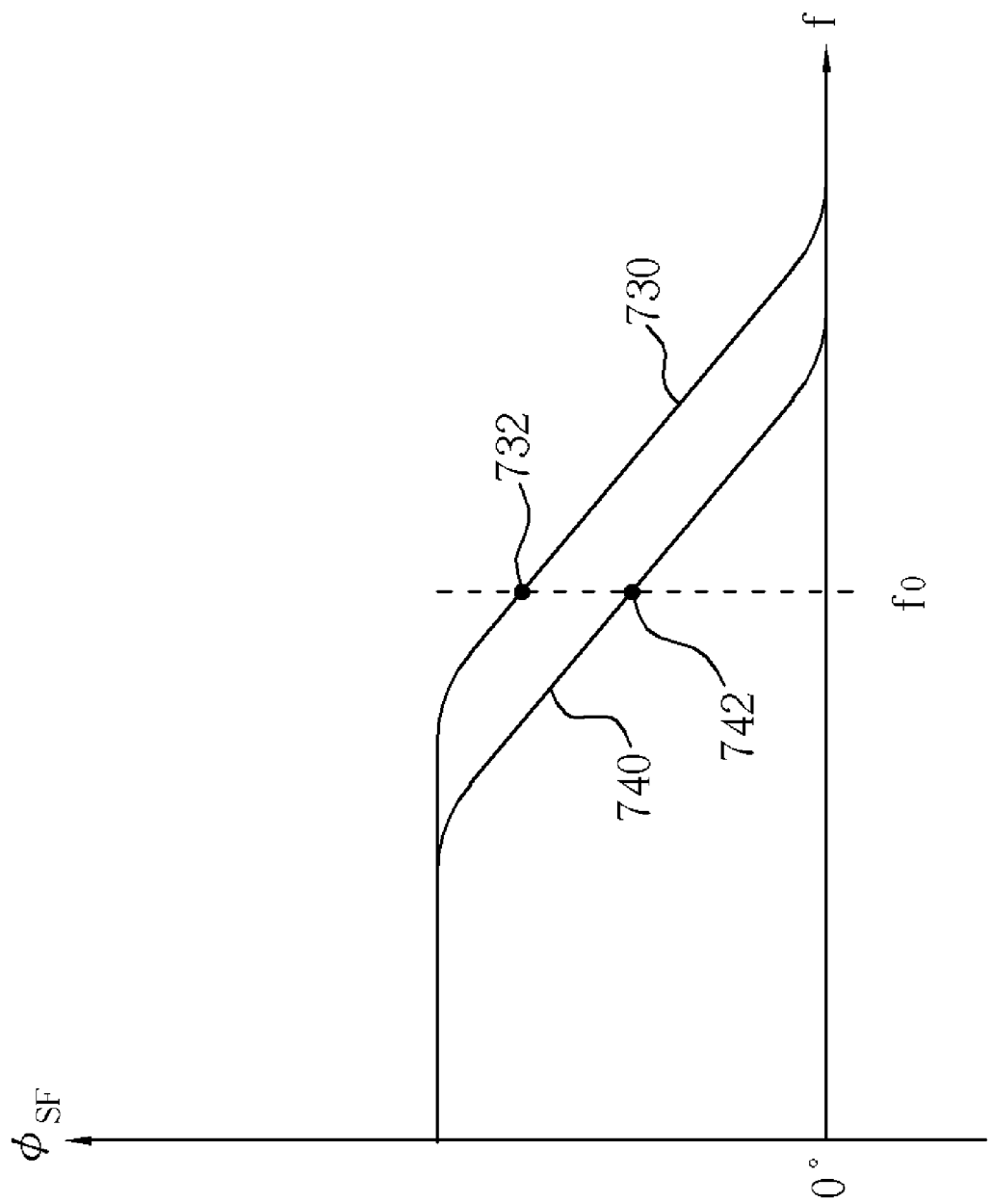
FIG. 12 is a diagram of a curve showing the closed loop phase and the frequency corresponding to the second embodiment.
Figure 13:
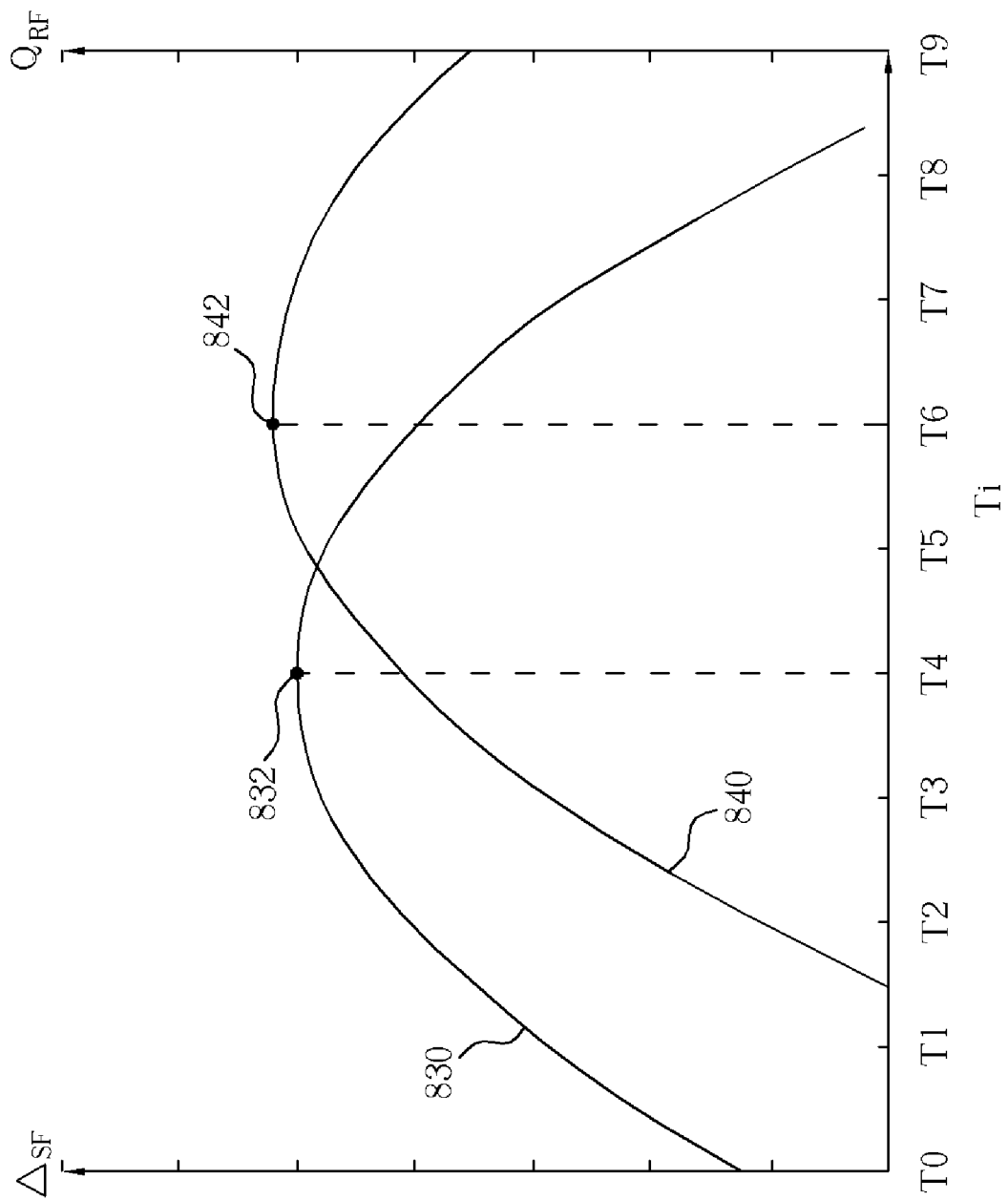
FIG. 13 is a diagram of two curves showing the relationship between the phase measuring level and the control parameter, and the relationship between the RF signal quality index and the control parameter corresponding to the second embodiment.

Please refer to FIG. 11, FIG. 12, and FIG. 13, which show a second embodiment according to the present invention. The second embodiment is similar to the first embodiment, and the difference between the first and the second embodiments is illustrated as follows. As shown in FIG. 11, the input signal of the above-mentioned phase detector 450 is the disturbance 412 and the output signal 435 of the calculation unit 434. Furthermore, each phase measuring level of the embodiment is a level of the output signal 342 of the phase detector 450 (in particular, the level of the output signal 342 is a phase measuring level $\Delta_{SF}$ of a closed loop sensitivity function). In addition, the phase measuring level $\Delta_{SF}$ of the closed loop sensitivity function represents a phase $\phi_{SF}$ of the closed loop sensitivity function (in this embodiment, the phase $\phi_{SF}$ is the phase difference between the disturbance 412 and the output signal 435). The relationship can be illustrated by the following equation:

$$\phi_{SF} = \Delta_{SF} * 180°, 0° \leq \phi_{SF} \leq 180°;$$

In the above equation, the value 180 can be utilized to perform the transformation between the phase measuring level $\Delta_{SF}$ and the phase $\phi_{SF}$ of the closed loop sensitivity function. In addition, the curves 730 and 740 showing the relationship between the phase $\phi_{SF}$ of the closed loop sensitivity function and the frequency f are shown in FIG. 12. The system control unit 350 utilizes the maximum point 832 of the curve 830 and the maximum point 842 of the curve 840 shown in FIG. 13 to determine the above-mentioned optimized control parameters Tx and Ty, where the curve 830 shows the relationship between the phase measuring level $\Delta_{SF}$ and the control parameter Ti, and the curve 840 shows the relationship between the RF signal quality index $Q_{RF}$ and the control parameter Ti. In another embodiment, the optimized value of the RF signal quality index $Q_{RF}$ is the minimum value (that is, the curve 840 has a concave shape), the values of all RF signal quality indexes $Q_{RF}$ can be transformed to be negative such that the optimized value becomes the minimum (that is, the curve 840 is transformed to have a convex shape).

One advantage of the present invention is that the number of devices utilized in the present invention is less than the related art device number, and the circuit structure of the present invention is easier to implement.

Another advantage of the present invention is that the present invention device and method can utilize the RF signal quality index corresponding to partial response signal-to-noise ratio (PRSNR), Sequenced Amplitude Margin (SAM), or simulated bit error rate (SBER) in a data section of an optical disc to compensate the optimized control parameter generated according to the closed loop phase, and the present invention can utilize the offset between the optimized control parameters generated according to the RF signal quality indexes. Therefore, the present invention device and method can be operated accurately in the non-data section of the optical disc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit of an optical disc drive comprising:
a loop phase calculation unit, for calculating a closed loop phase of a servo system according to at least one error signal of the servo system; and
a system control unit, coupled to the loop phase calculation unit, for generating an optimized control parameter according to the closed loop phase to perform compensation control;
wherein the loop phase calculation unit comprises a signal generator for generating a periodic disturbance signal cooperated with the error signal to calculate the closed loop phase, and the servo system comprises a tracking servo control system or a focusing servo control system, the compensation control is radial tilt control or focus balance adjustment, and the optimized control parameter is at least one optimized control parameter determined according to a plurality of closed loop phases calculated by the loop phase calculation unit.

2. The control circuit of claim 1, wherein the system control unit determines a first optimized control parameter corresponding to a first track radius from a plurality of control parameters, determines a second optimized control parameter corresponding to a second track radius from the plurality of control parameters, and performs an interpolation calculation or an extrapolation calculation according to the first track radius, the second track radius, the first optimized control parameter, and the second optimized control parameter to determine an optimized control parameter corresponding to a predetermined track radius to perform the compensation control.

3. The control circuit of claim 1, wherein the closed loop phases comprise a plurality of first phases corresponding to a first track radius of an optical disc and a plurality of second phases corresponding to a second track radius of the optical disc, wherein the first phases have a first extreme value, the first extreme value corresponds to a first tentative control parameter of the plurality of control parameters, and the control circuit further comprises:
an RF signal quality calculation unit, coupled to the system control unit, for calculating an optimized RF quality index corresponding to the first track radius;
wherein the optimized RF quality index corresponds to a first predetermined control parameter of the plurality of the control parameters, the system control unit calculates a control parameter offset according to the first predetermined control parameter and the first tentative control parameter, and the system control unit determines an optimized control parameter corresponding to the second track radius according the plurality of second phases and the control parameter offset.

4. The control circuit of claim 3, wherein the plurality of second phases comprise a second extreme value, the second extreme value corresponds to a second tentative control parameter of the plurality of control parameters, and the system control unit determines an optimized control parameter corresponding to the second track radius according to the second tentative control parameter and the control parameter offset.

5. The control circuit of claim 4, wherein the second tentative control parameter is equal to the first tentative control parameter.

6. The control circuit of claim 3, wherein the system control unit determines that the first predetermined control parameter is the optimized control parameter corresponding to the first track radius.

7. The control circuit of claim 3, wherein the optimized RF quality index corresponds to a partial response signal-to-noise ratio (PRSNR), a sequenced amplitude margin (SAM), or a simulated bit error rate (SBER).

8. The control circuit of claim 1, wherein the loop phase calculation unit further comprises:
at least one calculation unit, implemented by a subtracter or an adder, for inputting the periodic disturbance signal into the tracking servo control system or focusing servo control system to perform the subtracting or adding calculation on the periodic disturbance signal and the error signal; and
a phase detector, for detecting a phase difference between the periodic disturbance signal generated by the signal generator and the error signal, wherein the phase difference is equal to the closed loop phase.

9. The control circuit of claim 8, wherein the phase detector further comprises:
a band pass filter, coupled to the error detecting unit, for filtering the error signal to generate a band-pass filtered signal;
a digitizing unit, coupled to the band pass filter, for generating a binary signal according to the band-pass filtered signal;
an exclusive OR (XOR) unit, coupled to the digitizing unit, for performing an XOR logic operation on the disturbance signal and the binary signal to generate a pulse signal; and
a smooth filter, coupled to the XOR unit, for filtering the pulse signal to generate an output signal, wherein a level of the output signal corresponds to one of the plurality of phases.

10. A control method of an optical storage device comprising:
calculating a closed loop phase of a servo system according to at least one error signal of the servo system;
generating an optimized control parameter according to the closed loop phase to perform compensation control;
wherein the step of calculating a closed loop phase further comprises providing a signal generator for generating a periodic disturbance signal cooperated with the error signal to calculate the closed loop phase, and the servo system comprises a tracking servo control system or a focusing servo control system, the compensation control is radial tilt control or focus balance adjustment, and the optimized control parameter is at least one optimized control parameter determined according to a plurality of closed loop phases calculated in the step of calculating the closed loop phase.

11. The control method of claim 10, wherein the step of generating the optimized control parameter further comprises:
determining a first optimized control parameter corresponding to a first track radius of an optical disc from a plurality of control parameters and a second optimized control parameter corresponding to a second track radius of the optical disc from the plurality of control parameters; and
performing an interpolation calculation or an extrapolation calculation according to the first track radius, the second track radius, the first optimized control parameter, and the second optimized control parameter to determine an optimized control parameter corresponding to a predetermined track radius to perform the compensation control.

12. The control method of claim 10, wherein the closed loop phases comprise a plurality of first phases corresponding to a first track radius of an optical disc and a plurality of second phases corresponding to a second track radius of the optical disc, wherein the first phases have a first extreme value, the first extreme value corresponds a first tentative control parameter of the plurality of control parameters, and the control method further comprises:

calculating an optimized RF quality index corresponding to the first track radius; wherein the optimized RF quality index corresponds to a first predetermined control parameter of the plurality of the control parameters, and the step of generating the optimized control parameter further calculates a control parameter offset according to the first predetermined control parameter and the first tentative control parameter and determines an optimized control parameter corresponding to the second track radius according the plurality of second phases and the control parameter offset.

13. The control method of claim 12, wherein the plurality of second phases comprise a second extreme value, the second extreme value corresponds a second tentative control parameter of the plurality of control parameters, and the step of generating the optimized control parameter further determines an optimized control parameter corresponding to the second track radius according to the second tentative control parameter and the control parameter offset.

14. The control method of claim 13, wherein the second tentative control parameter is equal to the first tentative control parameter.

15. The control method of claim 12, wherein the step of generating the optimized control parameter further comprises:

determining that the first predetermined control parameter is the optimized control parameter corresponding to the first track radius.

16. The control method of claim 12, wherein the optimized RF quality index corresponds to a partial response signal-to-noise ratio (PRSNR), a sequenced amplitude margin (SAM), or a simulated bit error rate (SBER).

17. The control method of claim 10, wherein the step of calculating the closed loop phase further comprises:

utilizing the signal generator to generate the periodic disturbance signal;

inputting the periodic disturbance signal into the tracking servo control system or focusing servo control system; and detecting a phase difference between the periodic disturbance signal generated by the signal generator and the error signal, wherein the phase difference is equal to the closed loop phase.

18. The control method of claim 17, wherein the step of calculating the closed loop phase further comprises:

filtering the error signal to generate a band-pass filtered signal;

generating a binary signal according to the band-pass filtered signal;

performing an XOR logic operation on the disturbance signal and the binary signal to generate a pulse signal;

filtering the pulse signal to generate an output signal, wherein a level of the output signal corresponds to one of the plurality of phases.

* * * * *